[11] 3,572,894

[72] Inventors Howard J. Guggenheim
Somerville;
Hyman J. Levinstein, Berkeley Heights, N.J.
[21] Appl. No. 787,376
[22] Filed Dec. 27, 1968
[45] Patented Mar. 30, 1971
[73] Assignee Bell Telephone Laboratories Incorporated
Murray Hill, Berkeley Heights, N.J.

[54] FERRIC FLUORIDE DEVICES
6 Claims, 2 Drawing Figs.
[52] U.S. Cl........................................... 350/151,
252/62.51, 350/150
[51] Int. Cl............................................. G02f 1/22
[50] Field of Search........................................... 252/62.51;
350/151

[56] References Cited
OTHER REFERENCES

Wertheim et al., " Sublattice Magnetization in FeF3 Near the Neel Point" Solid State Communications Vol. 5 (1967) pp. 537—538

*Primary Examiner*—David Schonberg
*Assistant Examiner*—Paul R. Miller
*Attorneys*—R. J. Guenther and Edwin B. Cave ABSTRACT: Ferric fluoride evidences a magneto-optic effect of device interest over a broad frequency range including the major part of the visible spectrum. Modulators and isolators, either continuous or pulsed, may be operated over this entire frequency range at room temperature. Precautions to be taken to avoid flawing during growth of the material are described.

INVENTORS *H. J. GUGGENHEIM*
*H. J. LEVINSTEIN*

BY *George S. Indig*

ATTORNEY

FERRIC FLUORIDE DEVICES

BACKGROUND OF THE INVENTION

1. Field of the Invention

The invention is concerned with elements for use in the isolation and modulation of electromagnetic wave energy at frequencies including those of the visible spectrum and extending into the infrared. Ultimate use for such elements is, inter alia, in communication systems, switching systems, and memory arrays, and for these purposes such energy is ordinarily coherent. Elements of the type with which this invention is concerned operate on the magneto-optic principle. They generally depend for their operation upon the magnetic rotation which is imposed upon polarized wave energy resulting from impression of a magnetic field ordinarily having a component in the wave propagation direction. Other magneto-optic devices depend on magnetically induced birefringence, or, more generally, on induced changes in refractive index.

2. Description of the Prior Art

Magneto-optic materials have previously been proposed for the device uses with which this invention is concerned. Probably the first practical material so applied was yttrium iron garnet (YIG), and for several reasons, this material and compositional modifications remain the most promising candidates.

Unfortunately, the high frequency absorption edge for YIG is below the red end of the visible spectrum, and, accordingly, YIG is not a useful modulator material in the visible light spectrum. A recognized need exists for modulator materials which will operate in such a frequency range. Coherent light sources operating at such frequencies include helium-neon operating at 6328 A. units, the second harmonic of YAG-neodymium at 5324 A. units, and argon at 4880 A. units.

The need has been sufficient that each newly discovered magnetic material with any measurable transparency in the visible has been examined with a view to the possibility of modulation. Materials which have been examined with this in view include europium oxide (EuO) and chromium tribromide ($CrBr_3$). However, no commercially practical materials have yet emerged.

Recently, two new magnetic materials with transparency in the visible spectrum have been proposed for use in magneto-optic devices. These materials are rubidium iron fluoride ($RbFeF_3$) and thallium iron fluoride ($TlFeF_3$). Announcement of the suitability of these transparent magnetic materials for device use was favorably received by workers in the field and experimental devices have been constructed. As significant as these materials are, however, their value is somewhat diminished by their low Néel points requiring refrigerating at or below liquid nitrogen temperatures.

The need continues to exist for transparent materials evidencing domain magnetism at room temperature.

DETAILED DESCRIPTION

The Drawing

Figure 1:
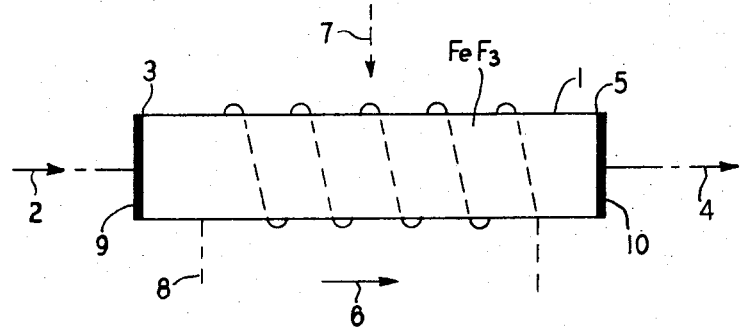
FIG. 1 is a front elevational view of a device in accordance with the invention using a crystal of ferric fluoride.

In FIG. 1, the element shown consist of crystalline body 1 of $FeF_3$. Provision is made for introduction of a plane polarized beam 2 of electromagnetic energy of a wavelength within the transparency range of $FeF_3$ at surface 3 and for extraction of a beam 4 at surface 5. The orientation of the crystal is ordinarily such that transmission is along [0001], <11$\bar{2}$0> or <10$\bar{1}$0> direction. The reasons for this selection will be discussed in detail under General Properties of $FeF_3$.

Application of a magnetic field of such magnitude as to magnetically saturate body 1 and in such direction as to produce a magnetization component in the beam transmission direction results in rotation of the beam within the medium of body 1. Such magnetization component is schematically indicated by arrow 6. Where component 6 is static, the device of FIG. 3 may be considered as an isolator. Proper selection of crystal length and/or magnetization direction such as to result in an appropriate component 6 may produce a rotation of 45°. Since magnetic rotation is nonreciprocal, any returning energy as may be produced by reflection from surface 5 is thrown out of phase with the incoming beam 2. In the usual isolator, field is applied parallel to the beam in which event crystal length may be directly selected on the basis presented in FIG. 1 as discussed above. The isolator function is otherwise conventional.

The device of FIG. 1 may also be operated as a modulator. In such operation, the magnitude of parallel magnetic component 6 is altered in accordance with a modulating signal. Such operation may be achieved by application of a field schematically depicted as arrow 7 which may be orthogonal to the beam direction and which is of sufficient magnitude to magnetically saturate body 1 in the direction in which it is applied. A modulating current may be passed through an encircling winding 8. The modulating field so produced has the effect of tilting the magnetization so as to result in a component 6 of varying magnitude. For reasons which will be discussed, a desired operating mode includes application of the orthogonal field 7 in a <10$\bar{1}$0> or <11$\bar{2}$0> crystallographic direction.

Operation of the device of FIG. 1 as a modulator is further described. Body 1 is magnetically saturated in this illustrative case by a normal magnetic field 7. The field applied may advantageously exceed the value required to saturate in order to increase the frequency of magnetic resonance and thereby to increase the frequency limitations of the device as is well known. In this mode of operation, a plane polarized light beam 2 propagated normal to the magnetization produced by field 7 and, for usual operation, desirably polarized parallel to or perpendicular to field 7 to avoid magnetically induced birefringence effects introduced at surface 3 passes through body 1 unchanged. Introduction of current through winding 8 tilts the magnetization so resulting in a component 6 in the light transmission direction. The magnitude of this component determines the degree of rotation or of phase change or of frequency change depending upon the system. Regardless of the mode of operation, the degree of modulation may be enhanced by use of optionally partially reflecting surfaces 9 and 10. The resulting cavitation permits retention of the light beam for a given statistical number of passes during each of which the modulation is increased. Since the power required to increase modulation in a given crystal length for a single pass varies as the square of the degree of modulation, the advantage from this standpoint is significant.

It has been indicated that the modulator may be operated in such manner as to result in phase change or in frequency change. Such alternative modes are well known. In a magnetic device dependent upon magnetic rotation, such alternative modes require the use of circularly polarized electromagnetic wave energy. For such a beam, variation in the length of magnetization components 6 effectively alters the path length. It is also possible to operate such a modulator in such a way as to depend on the magnetically induced birefringence rather than the gyromagnetic activity introduced by the field. Such operation is similar to that of an electro-optic modulator. For such operation, modulation, whether phase, amplitude, or frequency, may be achieved by use of plane polarized energy, however, using a polarization plane which is neither parallel to nor normal to the magnetization.

Figure 2:
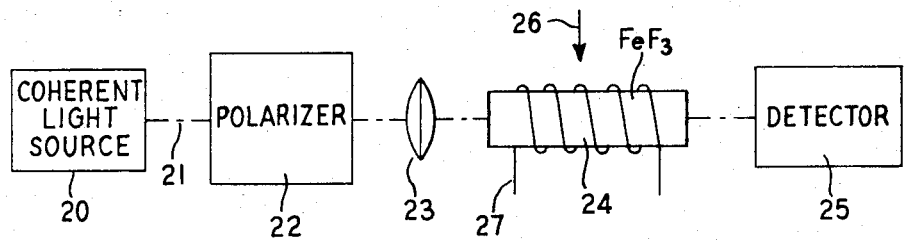
FIG. 2 is a schematic representation of a coherent light system utilizing a device of the invention as a modulator.

FIG. 2 is merely illustrative of otherwise well known systems useful for communications and other purposes. The apparatus of this figure consists of coherent light source 20 producing light beam 21, which passes through plane polarizer 22, focusing means 23, $FeF_3$ modulator 24 and detector 25 in succession. An applied field 26 having a component normal to the light transmission direction (in common with the preferred mode of operation of all modulators of this invention)

desirably maintains body 24 magnetically saturated. Modulating current introduced through winding 27 results in rotation of the plane polarized light beam to a degree dependent upon the magnitude of the component of magnetization lying in the transmission direction. In common with other modulation apparatus, the relative polarization directions of elements 22 and 25 depend upon the desired mode of operation. They may be crossed so as to block transmission in the absence of a modulating current, or they may be parallel to permit maximum transmission in the absence of modulating current. They may be at some intermediate angle for biased linear CW (continuous wave) operation, or, for one illustrative mode of digital operation which, while resulting in some loss, may take advantage of a rotation of less than 90°.

Alternate modes of operation are known. They include, for example, application of a DC field at some angle other than orthogonal to the beam direction. They include also the use of a completely reflecting end surface at the termination of the beam transversal path so as to result in a double pass device. Such mode of operation, of course, requires some means for separating the incoming and outcoming energy. Such means may include a Wollaston prism, and, depending upon crystal length and other operating conditions, may also include a static rotator. Such alternate arrangements are not considered a necessary part of this description and are, therefore, not depicted.

GENERAL PROPERTIES OF $FeF_3$

Rhombohedral $FeF_3$ is a clear green crystal. Transparency extends from the green wavelength (~4500 A.) down to about 10 microns. Since the coloration does not appear bluish, it is considered usable at wavelengths above that of green.

Ferric fluoride has a Néel temperature of approximately 393° K. above which it is paramagnetic. Below this temperature, magnetic ordering behaves as that of a canted antiferromagnetic. Crystallographically, $FeF_3$ is rhombohedral below its cubic transition which lies in the range of from 300° C. to 400° C. In accordance with convention, the material is treated as though it was hexagonal and the optic axis is accordingly designated [0001]. Easy directions lie in the plane normal to the optic axis, i.e., the basal plane or (0001). In accordance with this convention, the six major directions in the plane normal to the optic axis are designated $<11\bar{2}0> <10\bar{1}0>$.

General device design considerations suggest the use of the [0001] axis as the beam direction in devices dependent on magnetic rotation. This direction is generally desirable because the static (or crystalline) birefringence is zero. Largely from the standpoint of simplicity of design, this may also be the preferred beam direction for a device owing its operation to magnetically induced birefringence.

A usual operational mode would suggest the use of a saturating magnetic field applied normal to the beam direction. For the induced birefringence device, the applied field may be rotated within the plane normal to the beam between adjacent $<11\bar{2}0>$ and $<10\bar{1}0>$ directions. For more sophisticated devices, it is desirable to keep the crystal magnetically saturated at all times during operation. Some device designs may, however, permit one of the states to correspond with absence of an applied field. For most purposes, however, light scattering produced produced at domain walls is generally to be avoided.

For usual operation, the rotational device requires a varying magnetization component in the beam direction. This is commonly accomplished by imposing a magnetic field in the beam direction as by a current passed through an encircling winding. The degree of rotation is linearly related to the magnitude of the magnetization component parallel to the light beam.

The anisotropy of the system may suggest digital operation for a light beam direction parallel to the optic axis. A preferred orientation for analogue operation in a rotational device, however, at the sacrifice of crystalline birefringence, calls for a beam direction normal to the optic axis. In such an arrangement, the light beam may be propagated in a given direction in the plane normal to the optic axis. The saturating field is applied in a different direction probably again normal to the beam within the plane. The crystalline anisotropy and the desired mode of operation determines which, if either, of the field and beam are in a major crystallographic direction.

The orientations considered from a device standpoint above, while specific, are intended to be illustrative only. Other beam and field directions may be advantageous for particular modes of operation. Saturation magnetization values are temperature dependent particularly as the Néel point is approached. For typical configurations, saturation has been achieved at room temperature with fields of the order of 10 to 50 oersteds.

From the physical and chemical standpoint, $FeF_3$ is durable and unaffected by ordinary atmospheric materials. It is sufficiently hard so that it can be cut and polished to produce optically flat surfaces.

From the compositional standpoint, the magnetic properties, upon which this invention is based, are associated with the particular composition $FeF_3$. Some modification of this composition is possible and may be desirable to alter different device properties. It has been observed that the composition $CoF_3$ is isostructural with $FeF_3$ and it follows that a range of solid solutions of the two compounds may be prepared. To this end, up to 50 percent by weight of $CoF_3$ or other isostructural compound may be incorporated, from the magnetic standpoint, to increase or otherwise change the Néel temperature, to optically move the peak absorption to a different wavelength from the green associated with $FeF_3$, or to alter the crystallographic transition discussed further on.

Other inclusions, including impurities, may be tolerated generally to a maximum of about 1 percent by weight. A possible impurity is chlorine or bromine resulting from the incomplete conversion of the starting compound. Since the starting materials are isostructural in $FeF_3$, their effect is largely that of diluent.

PREPARATORY TECHNIQUE

Previous studies of $FeF_3$ have invariably been conducted on powders or on twinned crystals. Ascertainment of the growth conditions which may reliably result in untwinned crystals is considered to be part of this invention.

$FeF_3$ can be made by heating the hydrated salt in hydrogen fluoride to about 900° C. However, during cooling, the material undergoes a phase transformation from cubic to rhombohedral at a temperature in the range of from 300° C. to 400° C. It is observed that attempts to produce single crystal material are thwarted by this transformation and the product is usually a microcrystalline powder.

Recognizing that optical grade crystals would desirably be prepared at temperatures below the phase transformation, the following procedure was designed:

1. A boat filled with freshly prepared $FeCl_3$ is positioned within a furnace;
2. A dry flow of inert gas such as helium is introduced over the $FeCl_3$ which is heated to a temperature of up to about 300° C.;
3. The gas carrier with the contained $FeCl_3$ vapor is brought into contact with a counter current flow of fluorine gas; and
4. Under the proper conditions of pressure and temperature (1 mm. to 100 mm. Hg.) and (200° C. to 400° C.), the reaction $$2FeCl_3 + 3F_2 \rightarrow 2FeF_3 + 3Cl_2$$

takes place and $FeF_3$ is formed.

The pressure limits define an expedient range since lesser pressure results in a very slow reaction, and substantially greater pressure results in too fast a reaction to permit control.

The lower temperature limit is necessary for a practical transport rate, and exceeding the upper limit ordinarily results in flawing since, without additional precaution, the deposition site will be above the phase transition temperature.

The outlined procedure may also be carried out substituting $FeBr_3$ in part or in whole. Use of $FeBr_3$ dictates the lower temperature range of from 100° C. to 250° C. The lower limit results from greater volatility of $FeBr_3$ and the reduced upper limit corresponds with the decomposition temperature of $FeBr_3$. It follows that mixed systems are used at from between 100° C. and 200° C. minimum to 250° C. maximum.

The above system may be adapted directly to growth on a substrate. Such growth may result in enlargement of a massive crystal or may be directed toward epitaxial growth on a substrate of a different material.

An alternative approach is to grow from a flux of such nature that the melting point of the system is below the phase transition. Modification of the composition to increase the phase transition temperature permits growth at higher temperature by any growth method.

Some device uses may operate satisfactorily with a polycrystalline mass. An example is a thin polycrystalline layer with the beam propagated through the thin dimension.

We claim:

1. Magneto-optic device comprising a single crystal of a domain-magnetic material evidencing transparency for electromagnetic wave energy, first means for magnetically saturating the said crystal, and at least one additional means for introducing and extracting a beam of coherent polarized electromagnetic wave energy, characterized in that the said crystal consists essentially of $FeF_3$.

2. Device of claim 1 in which said additional means is at least one optically polished surface.

3. Device of claim 1 in which the beam propagation direction through the said crystal approximately corresponds with a [0001] crystallographic direction.

4. Device of claim 2 together with means for magnetically saturating in a direction lying in the (0001) plane.

5. Device of claim 1 in which the beam propagation direction through the said crystal approximately lies in a (0001) plane.

6. Device of claim 4 in which the direction of magnetization results in part from imposition of a first magnetic means applied in the (0001) plane and in part from an additional means for tilting the magnetization.